United States Patent [19]

Gogniat

[11] Patent Number: 4,942,755

[45] Date of Patent: Jul. 24, 1990

[54] WATCHCASE SUPPORT FASHIONED FROM A CONTOURED STRIP

[75] Inventor: Paul Gogniat, Bienne, Switzerland

[73] Assignee: ETA SA Fabriques d'Ebauches, Switzerland

[21] Appl. No.: 287,305

[22] Filed: Dec. 21, 1988

[51] Int. Cl.[5] .......... B23P 13/00

[52] U.S. Cl. .......... 72/254; 29/179; 368/280

[58] Field of Search .......... 368/276, 280, 281, 282, 368/295, 300; 72/254; 29/177, 179, 417, DIG. 15

[56] References Cited

U.S. PATENT DOCUMENTS

| | | | |
|---|---|---|---|
| 2,020,740 | 11/1935 | Putnam | 268/295 |
| 3,704,507 | 12/1972 | Grube | 29/417 |
| 4,034,552 | 7/1977 | Davidson | 368/280 |
| 4,236,239 | 11/1980 | Imgruth et al. | 368/276 |
| 4,463,057 | 7/1984 | Knurr | 72/254 |

FOREIGN PATENT DOCUMENTS

| | | | |
|---|---|---|---|
| 2329002 | 5/1977 | France . | |
| 34765 | 3/1977 | Japan | 368/280 |
| 48674 | 3/1984 | Japan | 368/300 |
| 294064 | 1/1954 | Switzerland . | |
| 346177 | 6/1960 | Switzerland . | |
| 887130 | 1/1962 | United Kingdom . | |
| 8604696 | 8/1986 | World Int. Prop. O. . | |

*Primary Examiner*—Lowell A. Larson
*Attorney, Agent, or Firm*—Griffin Branigan & Butler

[57] ABSTRACT

The watchcase support (1) of this invention is fashioned from a contoured strip (2) which includes a profile in relief elongated in the longitudinal direction of the strip. Such profile includes projections (3, 4) and recesses (5, 6) which form a decorative undulation. Other embodiments are described in which the profiles are functionally employed for example to attach the watchcase to the support.

20 Claims, 4 Drawing Sheets

WATCHCASE SUPPORT FASHIONED FROM A CONTOURED STRIP

This invention concerns a wrist watch including a watchcase and a support to which are attached the case and a bracelet, the support being removed from a portion of a contoured strip.

BACKGROUND OF THE INVENTION

This type of wrist watch is known from the state of the art under the designation of container watch. The French patent document FR 2 204 828 describes such a watch which is characterized in that it includes three elements, namely, the watch itself fashioned from a standard watchcase enclosing a movement and adapted to be mass produced, an intermediate decorative support element to which the watch may be fixed, and a bracelet attached to the intermediate support. The purpose of the cited invention is to associate the watch itself with an interchangeable support, for instance conservatively decorated to be worn during the day, or with more elaborate and refined decorations for evening wear. Although not mentioned in the description, the idea of a container watch is also of interest for after-sales service. Effectively, repairs to be effected to the watch itself may be brought about simply by proceeding with a standard exchange of the latter and this without loss of time for the client, the case and its defective movement being sent back to the factory for repairs and subsequently used in another support.

A wrist-watch of this type has been commercialized under the registered trademark "Dynamic". To a support in the form of a ring are fastened the two strands of a bracelet. The watchcase which bears a flange is introduced into the ring and then is fixed thereto by means of a nut screwed into a groove provided about the case. Here the support is very simple and may be manufactured from a strip having a rectangular cross-section. Therein there are no particular decorative aspects. It may also be noted that the support requires costly retouch operations, the latter being necessary if for no other reason than to form the attachment lugs for attaching the bracelet.

It has also been proposed to mass produce a caseband for a watchcase on the basis of a contour extruded in the form of a tube. The British patent document GB-A-887 130 shows such an arrangement wherein, after having attached lugs by welding them along the tube, the latter is cut into slices in order to obtain the desired caseband. This system is relatively expensive to put into practice and above all does not permit obtaining directly from the contour a profile in relief elongated in the sense in which the profile is drawn since the profile shown in the cited document is a tube and not a strip as in the present invention.

French patent document FR-A-2 329 002 describes a watchcase including a bezel made from folded sheet metal including two attachment ridges thanks to which there may be assembled a watch crystal and a back cover-container. However here there is found no profile in relief which could be obtained from a contoured strip as is the case in the present invention.

SUMMARY OF THE INVENTION

Thus, to overcome the cited disadvantages, the support of this invention is characterized in that it exhibits a profile in relief originating in the strip and elongated in the longitudinal direction thereof. The invention likewise extends to the contoured strip for the manufacture of watchcase supports as well as to the method for the mass production of such supports.

Thus, one of the purposes of the invention is to provide a support for a watchcase which, being removed from a portion of a contoured strip possesses a profile in relief employed as decoration for said support.

Another purpose of the invention is to employ said profile in relief to act as fastening means for the bracelet to the support.

A further purpose of the invention is to employ said profile in relief to serve as means for fastening decorative inserts to the support.

Finally, a purpose of the invention is the employment of said profile in relief in order to fasten the watchcase to the support.

The invention will be better understood following reading of the description of the several embodiments thereof given by way of non-limiting examples and illustrated by the drawings in which:

DESCRIPTION OF THE PREFERRED EMBODIMENTS

Figure 1:
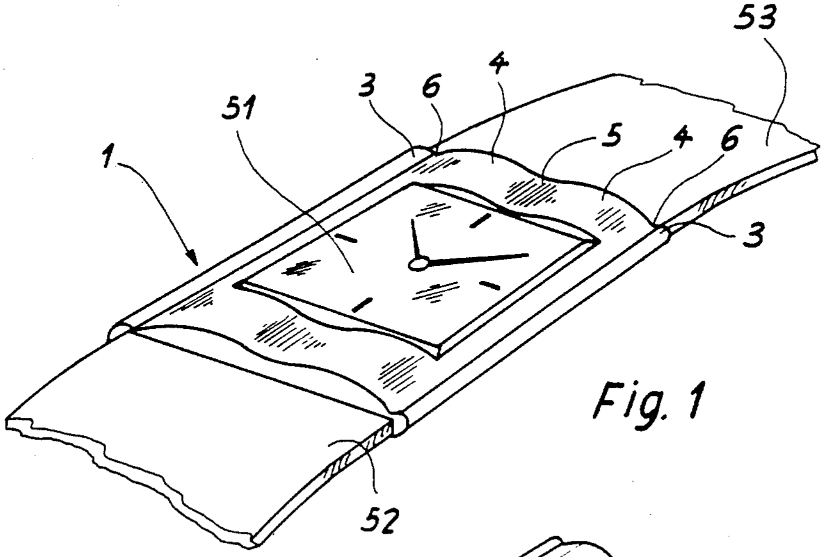
FIG. 1 shows a watch case support according to a first embodiment of the invention to which support is attached a bracelet and a case, said support being removed from a strip profiled in relief in order to exhibit decorative patterns.

The support 1 disclosed on FIG. 1 shows a first embodiment of the invention. This support 1 bears a watchcase 51 and strands 52 and 53 of a bracelet. This support is obtained from a contoured strip 2 shown to reduced scale on FIG. 2. Essentially and according to the invention, the support exhibits a profile in relief which is obtained from strip 2 and which is elongated in the longitudinal direction of said strip. By relief it is understood here the form of a surface which includes projections and/or recesses. In the example of FIG. 1, there are to be found projections at the locations referenced 3 and 4 and recesses as referenced 5 and 6. These projections and recesses already form part of the strip 2 from which the support 1 is removed. In order to obtain the support 1 from the strip 2, it is sufficient to form an opening for the watchcase and to slice off the strip.

Figure 2:
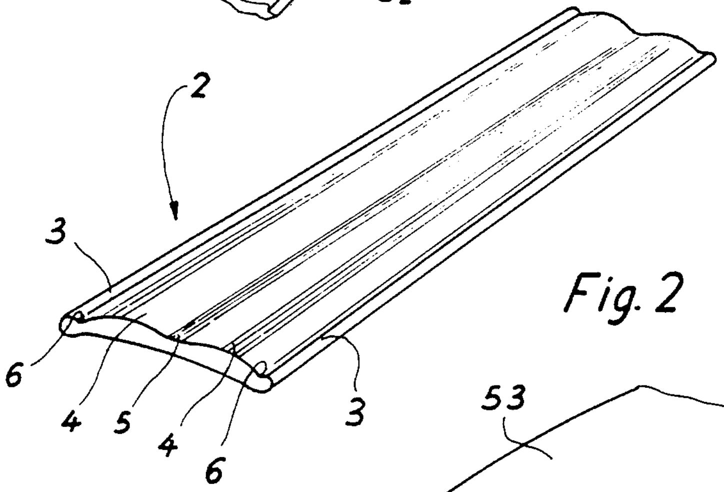
FIG. 2 shows to a reduced scale a contoured strip from which may be removed the support of FIG. 1.

FIGS. 1 and 2 further show that the support 1 is removed from a portion of a contoured strip 2 exhibiting a slight arching substantially perpendicular to the longitudinal direction of the strip. In this case the arching is already present in the contour itself. This arching however could also be absent in which case the lower face of the support would be flat. Without the necessity of an illustration, it may be said that strip 2 could also be arched mechanically, parallel to the longitudinal direction of the strip. Likewise, as is apparent on FIG. 3, support 1 may at the same time exhibit both archings, in this case, giving it the form of a cap. Finally, one or the other of such archings or both could be provided following the separation of the support from the strip.

Figure 3:
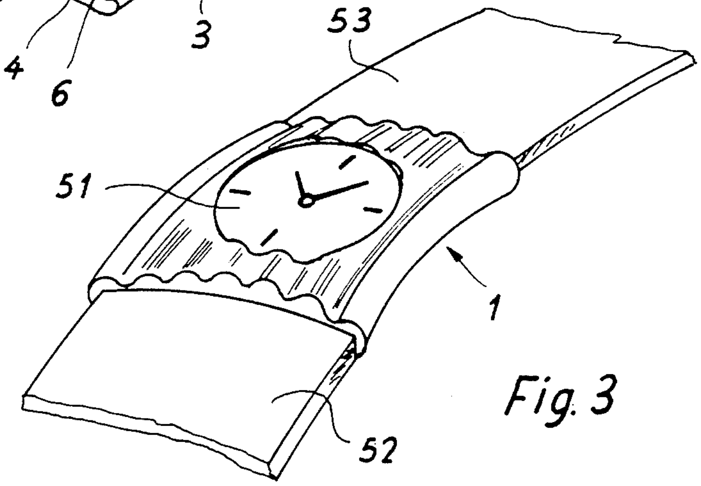
FIG. 3 shows a variant of the support derived from the embodiment shown on FIG. 1.

The profile in relief of FIGS. 1 and 3 shows projections and recesses which define decorative patterns only. Here are shown wave forms. Other forms could be imagined which could for instance provide sharp edges or particular designs.

FIGS. 1 and 3 also show an elongated contour in the sense 12 o'clock to 6 o'clock of the watch. One will find an analogous situation in FIG. 7. As already suggested, FIG. 3 exhibits furthermore a support arched in the sense 12 o'clock to 6 o'clock of the watch. The contour could also be drawn in the sense 9 o'clock to 3 o'clock of the watch as may be seen on FIGS. 6, 8, 9 and 10.

Figure 4:
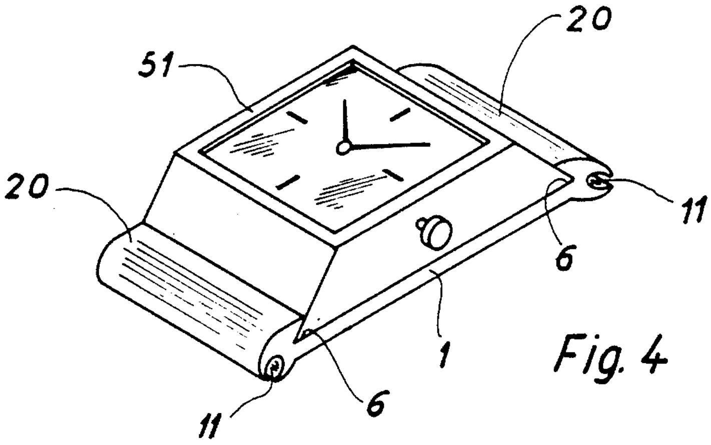
FIGS. 4 and 5 each show a watchcase support according to a second embodiment of the invention in which the contour includes structures serving as fastening means for the case to the support.
Figure 5:
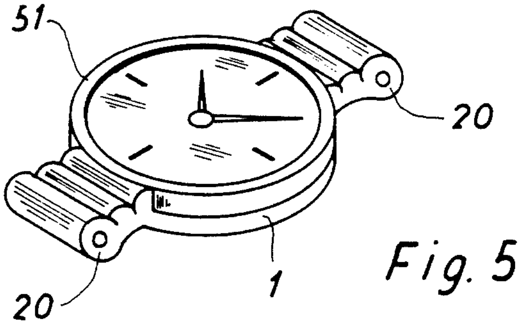

FIGS. 4 and 5 each show a watchcase support according to a second embodiment of the invention in which the contour exhibits structures serving as means for fastening the watchcase 51 to the support.

For this purpose the support 1 of FIG. 4 exhibits projections 20 which define facing slide channels 6 in which slide channels may be introduced the watchcase 51. The contoured strip forming support 1 further includes recessed structures 11 which serve for fastening a bracelet (not shown). FIG. 5 shows a variant of the construction in which the projections 20 permit the fastening of a round case 51 to the support 1, the projections being arranged in a manner to permit for instance a snap assembly. It will be noted with reference to FIG. 5 that the projections 20 are garnished with surface decorations likewise obtained from the contoured strip. These projections could also be attached to the support subsequently by using inserts in the manner of those described having reference to FIGS. 8 and 9 which will be subsequently discussed.

Figure 6:
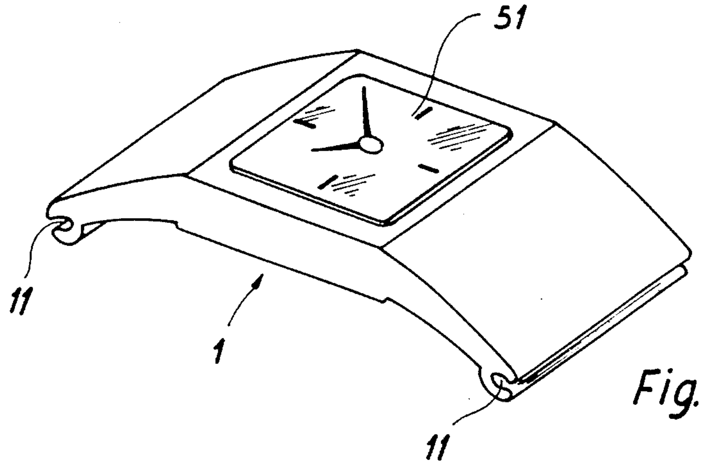
FIGS. 6 and 7 each show a watchcase support according to a third embodiment of the invention in which the contour includes structures serving as bracelet attachment means.
Figure 7:
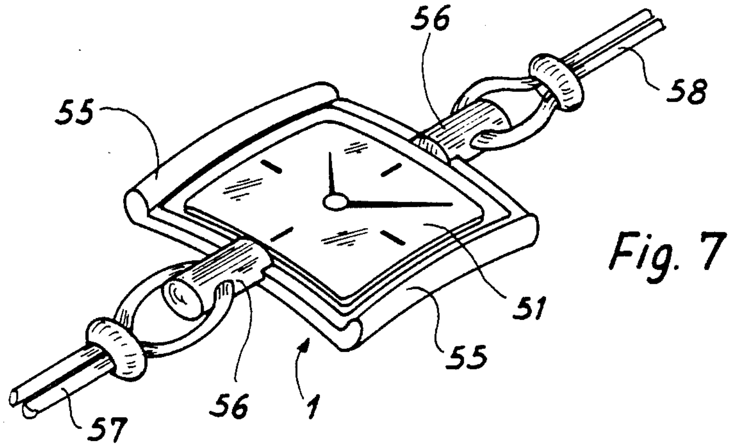

FIGS. 6 and 7 each show a watchcase support according to a third embodiment of the invention in which the contoured strip includes structures serving as bracelet attaching means.

FIG. 6 exhibits attachment means which have already been suggested having reference to FIG. 4 and which are obtained by forming projections provided with recesses 11 elongated in the longitudinal direction of the contour. Each of the bracelet strands (not shown) includes beads which may be threaded into the recesses 11. Support 1 of FIG. 6 also shows a straight section perpendicular to the contour which is very drawn out and which permits giving the watch a special decorative aspect. The figure shows that the support has its greatest thickness under the watchcase and this for functional reasons.

FIG. 7 shows a watchcase support the upper face of which is provided with projections 55 and cord lugs 56 directed in the longitudinal direction in which the contour has been drawn. The watch is attached to the wrist by means of a bracelet the strands 57, 58 of which pass through orifices provided in the cord lugs.

Figure 8:
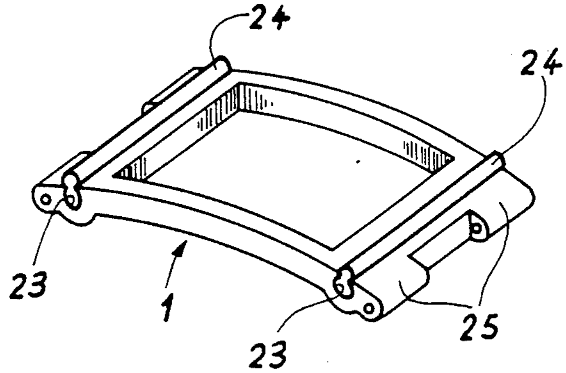
FIGS. 8 and 9 each show a watchcase support according to a fourth embodiment of the invention in which the structure includes profiles serving to attach inserts.
Figure 9:
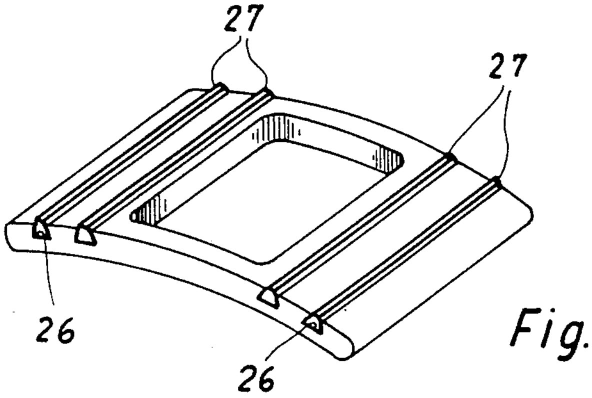

FIGS. 8 and 9 each show, according to a third embodiment of the invention, a support 1 provided with purely decorative inserts. FIG. 8 shows a support the recesses 23 of which obtained from the contoured strip serve as fastening means for rounded strips 24. It will be noted that in this embodiment the fastening means for the bracelet comprise lugs 25 obtained, following the other operations, through machining. The decorative strips 24 may be formed of gold. FIG. 9 is distinguished from FIG. 8 in that the recesses 26 into which the decorative strips 27 are inserted have a triangular form.

Figure 10:
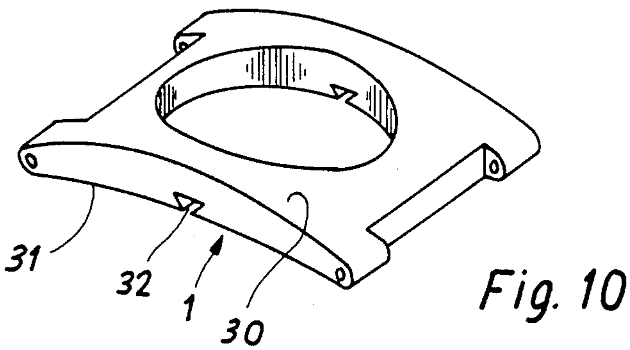
FIG. 10 shows a watchcase support according to the fifth embodiment of the invention in which the structure is profiled simply through the fact that the upper and lower faces thereof are not parallel.

FIG. 10 shows a watchcase according to a fourth embodiment of the invention seen in its most simple form. Here support 1 is removed from a contoured strip in which the profile elongated in the longitudinal direction of the strip is obtained by bestowing on the upper face 30 of the support a radius of curvature smaller than the radius of curvature 31 of the support. As a variant, the lower face could be planar. FIG. 9 also shows that the support is provided with a recessed profile 32 which here defines an indication of origin. In this respect it will be noted that groove 32 as has been shown may be obtained only from a contoured strip and that its presence serves as attestation that the support has been manufactured according to this invention.

The explanations which have just been given show how easily one may produce a watchcase support having relatively complicated shapes and cross-sections starting from a material in strip form already having the form and cross-section as desired. This type of contoured strip is well-known, for instance in the technology of architectural construction and is obtained in lengths at relatively low prices. It has however never been proposed for the manufacture of watchcase supports. One may thus obtain very inexpensive supports since one avoids a large number of machining and subsequent retouching operations. It will also be noted that the support thus realized is obtained in a single piece which avoids attaching pieces which must inevitably be fastened to the support itself by means of fastenings such as screws. The support formed of a single piece likewise enables one to offer a rigid support which runs no risk of falling apart.

It is self-evident that the idea of a contoured strip is connected to the idea of manufacturing of such strip which may for instance be obtained by extrusion, drawing or rolling. Such a strip may be made of the most diverse materials ranging from plastic materials to ceramic and including for instance aluminum, brass, steel and precious metal.

Figure 11:
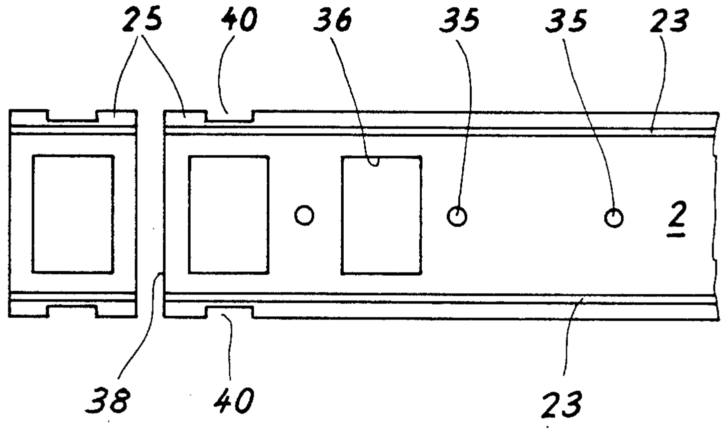
FIG. 11 shows a method of manufacture of the support of FIG. 8 starting from a contoured strip.

FIG. 11 shows briefly the manufacturing stages of the support according to the invention and according to the embodiment shown on FIG. 8 by way of example.

The contoured strip 2 is seen from the crystal side of the watch and exhibits two recesses 23 intended to receive decorative inserts. One begins by piercing pilot holes 35 employed for the transport and guidance of the strip. One next forms an opening 36 in which the watchcase will be housed. Other operations may further be brought about at this stage as for instance providing bevels, bearing surfaces, housings 40, etc., all such machining operations being effected prior to separating the support from the strip. Next the support is removed from the strip by a cut-off operation shown on the drawing by line 38. Should it thereafter be necessary, the machining of the support may then be terminated.

What I claim is:

1. A method of making a wristwatch case support, said method comprising the steps of:

forming a contoured strip exhibiting a profile in relief, said profile in relief comprising repeating segments extending in the longitudinal direction of said strip;

shaping said strip while leaving said profile in relief unchanged in at least one zone of each of said repeating segments, said shaping including at least the forming of at least one recess in said strip within each of said repeating segments configured to receive a wristwatch case, whereby each of said segments comprises a wristwatch case support; and, separating said repeating segments subsequent to said shaping, whereby said profile in relief is present in each of said supports after said separation.

2. The method of making a support as claimed in claim 1 wherein said step of forming said contoured strip includes forming projections for attachment to a bracelet, said projections being formed at each side of said strip and extending throughout the longitudinal extent of said strip.

3. The method of making a support as claimed in claim 1 wherein said step of forming said contoured strip includes forming projections for attachment to a bracelet, said projections being formed transverse to the longitudinal extent of said strip, said separating step comprising separating said repeating segments at a point intermediate two of said projections.

4. The method of making a support as claimed in claim 1 wherein the step of forming the contoured strip comprises forming an arcuate surface, the arc of said surface extending perpendicular to the longitudinal direction of said strip.

5. The method of making a support as claimed in claim 1 wherein the step of forming the contoured strip comprises forming an arcuate surface, the arc of said surface extending parallel to the longitudinal direction of said strip.

6. A method as claimed in claim 1 wherein the step of forming said contoured strip comprises shaping a material by one of the group of methods comprising extruding, drawing and rolling.

7. The method as claimed in claim 1 wherein the step of shaping said strip comprises forming two parallel recesses in each of said repeating segments, said recesses comprising slide channels for receiving a wristwatch case.

8. The method as claimed in claim 1 wherein the step of shaping said strip comprises forming a single recess within each of said repeating segments for receiving a wristwatch case.

9. The method as claimed in claim 1 wherein the step of shaping said strip includes forming projections within each of said repeating segments for attaching a bracelet thereto.

10. A method of making a wristwatch case support, said method comprising the steps of:

forming a contoured strip exhibiting a profile in relief, said profile in relief comprising repeating segments extending in the longitudinal direction of said strip;

shaping said strip while leaving said profile in relief unchanged in at least one zone of each of said repeating segments, said shaping including at least the forming of two parallel recesses in said strip within each of said repeating segments configured to receive a wristwatch case, whereby each of said segments comprises a wristwatch case support; and, separating said repeating segments subsequent to said shaping, whereby said profile in relief is present in each of said supports after said separation.

11. A wristwatch case support made in accordance with the method of claim 10.

12. A wristwatch case support made in accordance with the method of claim 6.

13. A wristwatch case support made in accordance with the method of claim 7.

14. A wristwatch case support made in accordance with the method of claim 8.

15. A wristwatch case support made in accordance with the method of claim 9.

16. A wristwatch case support made in accordance with the method of claim 1.

17. A wristwatch case support made in accordance with the method of claim 2.

18. A wristwatch case support made in accordance with the method of claim 3.

19. A wristwatch case support made in accordance with the method of claim 4.

20. A wristwatch case support made in accordance with the method of claim 5.

* * * * *